G. L. McMASTERS.
NUT LOCK.
APPLICATION FILED JUNE 10, 1920
1,364,884.
Patented Jan. 11, 1921.
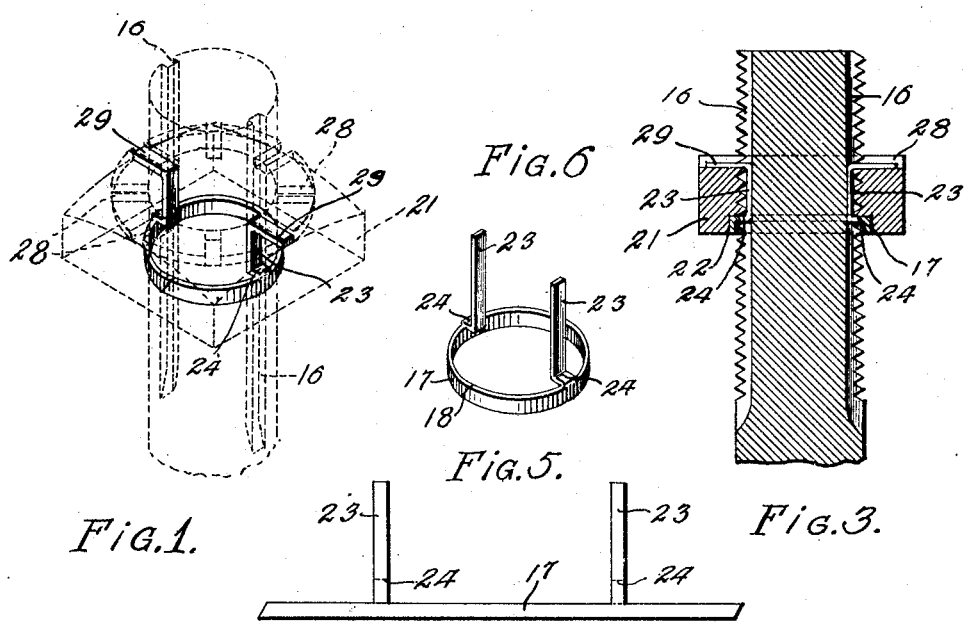
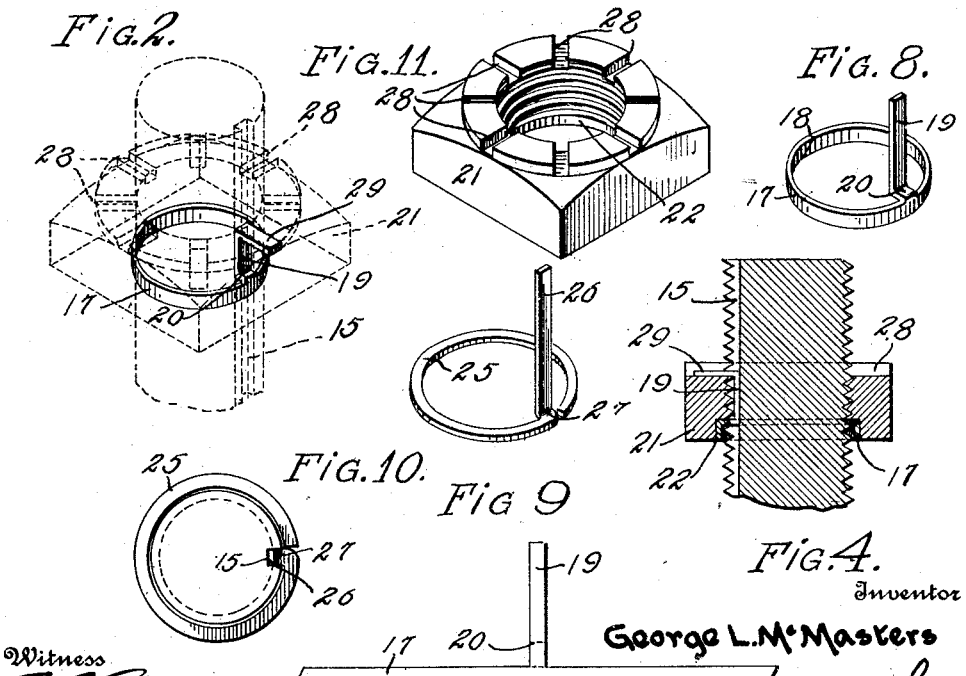
Inventor
George L. McMasters

UNITED STATES PATENT OFFICE.

GEORGE L. McMASTERS, OF IUKA, MISSISSIPPI.

NUT-LOCK.

1,364,884.  Specification of Letters Patent.  Patented Jan. 11, 1921.

Application filed June 10, 1920. Serial No. 388,021.

*To all whom it may concern:*

Be it known that I, GEORGE L. MCMASTERS, a citizen of the United States, residing at Iuka, in the county of Tishomingo and State of Mississippi, have invented certain new and useful Improvements in Nut-Locks, of which the following is a specification.

This invention relates to nut locks and has for an object to provide a locking mechanism of improved type embodying new features of economy, facility of application and reliability.

A further object of the invention is to provide a lock adapted to operate in conjunction with a bolt having a longitudinal groove with improved means for locking the nut in conjunction with the groove.

With these and other objects in view the invention comprises certain novel units, elements, combinations and modifications as will be hereinafter more fully described and claimed.

In the drawings Figure 1 is a perspective view of the improved nut lock employing two longitudinal furrows in the bolt and corresponding and co-acting parts.

Fig. 2 is a perspective view of the nut lock embodying a single furrow in the bolt with corresponding and co-acting parts.

Fig. 3 is a longitudinal diametrical sectional view through the type of lock shown in Fig. 1.

Fig. 4 is a longitudinal diametrical sectional view through the type of lock shown at Fig. 2.

Fig. 5 is a view in side elevation of the blank from which the locking member shown in Fig. 1 is constructed.

Fig. 6 is a perspective view of the completed locking member disassociated from the bolt and nut.

Fig. 7 is a view in side elevation of the blank from which the locking member shown in Fig. 2 is constructed.

Fig. 8 is a view in perspective of the completed locking member as shown in Fig. 2 disassociated from the bolt and nut.

Fig. 9 is a perspective view of a modification of the locking member constructed of wire.

Fig. 10 is a plan view of the modified type shown in Fig. 9.

Fig. 11 is a view in perspective of a different type of nut upon which the locking member is adapted to operate.

Like characters of reference indicate corresponding parts throughout the several views.

The improved nut lock which forms the subject matter of this application in its several modifications is adapted to operate with a bolt provided with a single longitudinal groove or furrow as shown at 15 in Figs. 2, 4, and 10, or with a plurality of furrows as shown at 16 in Figs. 1 and 3.

The preferred form comprises a cylindrical band or ring 17 bent to form nearly a complete circle with an opening at 18 giving resiliency to the ring, permitting it to slide downwardly upon the threaded portion of the nut. The ring is of such width as to span somewhat more than the interval between threads whereby the ring may be slidably moved without engagement upon the threads. For the use of the device upon the bolts with a single groove, a tongue 19 is offset laterally from one side of the ring, preferably, though not necessarily, opposite the opening 18. This tongue is bent inwardly toward the center of the ring as at 20 so that the tongue 19 will be seated within the groove 15 permitting the nut 21 to be applied to the threads in substantially the usual and ordinary manner. The nut is provided with an annular rabbet in its under side indicated at 22 of sufficient and proper size to receive and embrace the ring 17.

With the type of fastener employed upon the double grooved bolt as shown at Figs. 1 and 3, two of the tongues 23 are employed likewise bent inwardly at 24 so that the two tongues are seated wholly within the grooves 16.

In the modification shown at Figs. 9 and 10 the ring 25 is constructed of wire and the tongue 26 bent inwardly at 27 in like manner.

The nut which is employed with this fastener may be of any of the types shown in the several figures but is provided in each and every case with radial slots 28 of any approved number. When the nut has been seated, the extremity of the tongues 19, 23 or 26 extending upwardly within the slot or slots of the bolt are bent outwardly and downwardly into the radial slots as indicated at 29.

The retention of the tongue within the groove or grooves and within the radial slots efficiently prevents retroactive movement of the nut but it will be obvious that the tongue may be bent upwardly when it is desired to remove the nut whereupon the nut is free to be actuated by a wrench in the usual manner.

As pointed out, the advantage of this nut lock aside from its cheapness of manufacture, is that it slides over the threads of the bolt without obstruction, permitting the free application of the nut in the usual manner.

I claim:

The combination with a threaded bolt having a longitudinal furrow, of a threaded nut having an annular rabbet in its under side deeper than the pitch of the threads, abutments upstanding from the top of the nut, a band wider than the pitch of the threads loosely embracing the bolt and loosely seated within the rabbet, and a tongue inset from the band and extending through the nut within the furrow and having an extremity protruding beyond the nut and adapted to be bent into the path of movement of the abutments.

In testimony whereof I affix my signature.

GEORGE L. McMASTERS.